(12) United States Patent
Robinson

(10) Patent No.: US 12,007,000 B2
(45) Date of Patent: *Jun. 11, 2024

(54) ROPE TIE

(71) Applicant: William G. Robinson, Wayzata, MN (US)

(72) Inventor: William G. Robinson, Wayzata, MN (US)

(73) Assignee: GROTH ENTERPRISES LLC, Spring Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,170

(22) Filed: Sep. 20, 2021

(65) Prior Publication Data

US 2022/0090650 A1    Mar. 24, 2022

Related U.S. Application Data

(60) Continuation-in-part of application No. 16/048,583, filed on Jul. 30, 2018, now Pat. No. 11,125,300, which is a division of application No. 15/041,936, filed on Feb. 11, 2016, now Pat. No. 10,036,448.

(60) Provisional application No. 62/116,026, filed on Feb. 13, 2015.

(51) Int. Cl.
| | |
|---|---|
| *B65H 69/00* | (2006.01) |
| *A01K 1/04* | (2006.01) |
| *A01K 1/06* | (2006.01) |
| *F16G 11/00* | (2006.01) |
| *F16G 11/10* | (2006.01) |
| *F16G 11/14* | (2006.01) |
| *B63B 21/08* | (2006.01) |
| *B63B 21/20* | (2006.01) |

(52) U.S. Cl.
CPC ............. *F16G 11/00* (2013.01); *A01K 1/04* (2013.01); *A01K 1/06* (2013.01); *B65H 69/00* (2013.01); *F16G 11/101* (2013.01); *F16G 11/14* (2013.01); *F16G 11/146* (2013.01); *B63B 21/08* (2013.01); *B63B 21/20* (2013.01)

(58) Field of Classification Search
CPC ......... B65H 69/00; F16G 11/00; F16G 11/02; F16G 11/08; F16G 11/10
USPC ....... 24/16 R, 115 R, 132 R, 134 L; 289/1.5, 289/2, 13; 294/82.14
See application file for complete search history.

(56) References Cited

U.S. PATENT DOCUMENTS

| | | | |
|---|---|---|---|
| 1,074,736 A | | 10/1913 | Noll |
| 1,372,789 A | * | 3/1921 | Vanderdonck .......... F16G 11/14 24/134 L |
| 1,461,498 A | | 7/1923 | Shaner |
| 1,496,568 A | | 6/1924 | Vanderdonck |
| 1,969,026 A | | 8/1934 | Morris |
| 4,005,509 A | | 2/1977 | Verdina |
| 4,278,042 A | * | 7/1981 | Lindquist ................ B63B 21/08 188/65.2 |
| 4,669,688 A | * | 6/1987 | Itoh .......................... H02G 3/30 24/297 |
| 5,408,729 A | | 4/1995 | Schwartz |

(Continued)

*Primary Examiner* — David J Parsley
(74) *Attorney, Agent, or Firm* — R. John Bartz

(57) ABSTRACT

A hand-held rope tie is operable to releasably hold one or more portions of a rope. Pivotally connected arm members accommodate and hold the rope portions with a selected clamping pressure. The rope tie is adjustable to tightly grip and clamp onto the rope without slippage of the rope through the arms when desired.

15 Claims, 15 Drawing Sheets

(56) References Cited

U.S. PATENT DOCUMENTS

| | | | |
|---|---|---|---|
| 5,729,872 A | 3/1998 | Ginocchio | |
| 5,816,636 A | 10/1998 | Gibson | |
| 6,101,684 A | 8/2000 | Ginocchio | |
| 6,742,223 B1 | 6/2004 | Chang | |
| 7,500,643 B2 | 3/2009 | Leone | |
| 7,752,719 B2 | 7/2010 | Howard | |
| 7,900,324 B2 | 3/2011 | Ginocchio | |
| 8,246,095 B2 | 8/2012 | Radle | |
| 8,584,324 B1 * | 11/2013 | Shotey | F16L 3/1041 24/132 WL |
| 8,631,544 B1 | 1/2014 | Shotey | |
| 8,635,750 B1 * | 1/2014 | Ginocchio | H02G 3/32 24/30.5 R |
| 8,756,767 B1 | 6/2014 | Baldwin | |
| 8,801,062 B2 | 8/2014 | Mansfield | |
| 8,850,669 B1 | 10/2014 | Klein | |

\* cited by examiner

ROPE TIE

CROSS REFERENCE TO RELATED APPLICATION

This application is a continuation-in-part of U.S. patent application Ser. No. 16/048,583 filed Jul. 30, 2018. U.S. patent application Ser. No. 16/048,583 is a division of U.S. patent application Ser. No. 15/041,936 filed Feb. 11, 2016. U.S. patent application Ser. No. 15/041,936 claims the priority of U.S. Application Ser. No. 62/116,026 filed Feb. 13, 2015.

FIELD OF THE INVENTION

The technology of the invention relates to rope and line ties and methods of tying ropes and lines.

BACKGROUND OF THE INVENTION

Horse owners love their horses and want to keep them safe, comfortable and happy. Any time a horse is tied there is a risk that the horse may spook and pull back. If the horse is tied hard and fast with a knot, and cannot move its feet, it could lead to a full force panic that could injure the horse and persons nearby, and result in substantial property damage. Generally, allowing the horse to take a few backward steps will relieve panic and avoid a pull back wreck.

Further, there is a need for boaters who for whatever reasons do not like to tie a knot in lines used when docking and anchoring boats. Docking a boat can prove challenging in low-light and crowded conditions. Tying up and docking a boat can be difficult because of waves, water currents and wind conditions and typically needs to be done as quickly as possible to avoid damage to the boat and the dock.

SUMMARY OF THE INVENTION

The rope tie of the invention has pivotally connected arms adapted to swing inwardly toward each other and wrap around two side-by-side portions of a rope that come together after being looped around a suitable tie site. Resistance is regulated by adjusting the position of the arms relative to the portions of the rope and maintaining the selected position. This adjustment allows a horse to take a few steps backward and relieve the panic of the horse while remaining tied to the tie site. Adjustment can also be made to prevent movement of the rope through the rope tie thereby securing a boat to a dock without tying a knot.

DESCRIPTION OF THE INVENTION

In the following detailed descriptions of the rope tie, reference is made to the accompanying drawing that form a part hereof, and in which are shown, by way of illustration, specific embodiments in which the invention may be practiced. It is to be understood that other embodiments may be utilized and structure changes may be made or other method steps and sequence thereof may be used without departing from the scope of the present invention. The rope tie is herein described as used in equine and marine environments. The rope tie can have uses in other environments when tying rope around a tie site is desired, such as camping, gardening, construction, towing and canis environments.

Figure 1:
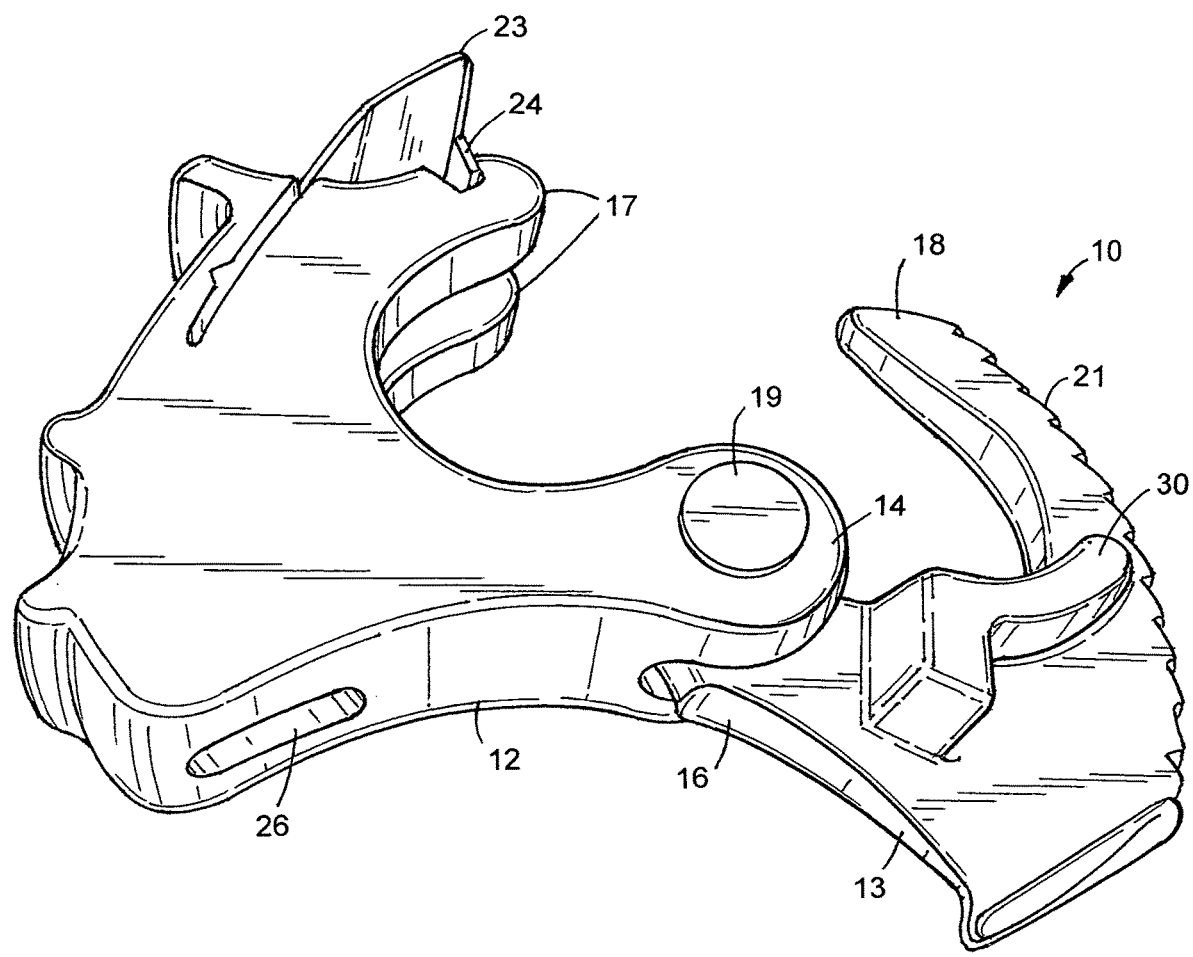
FIG. 1 is a perspective view of the rope tie of the invention with the first and second arm members in an open position.
Figure 2:
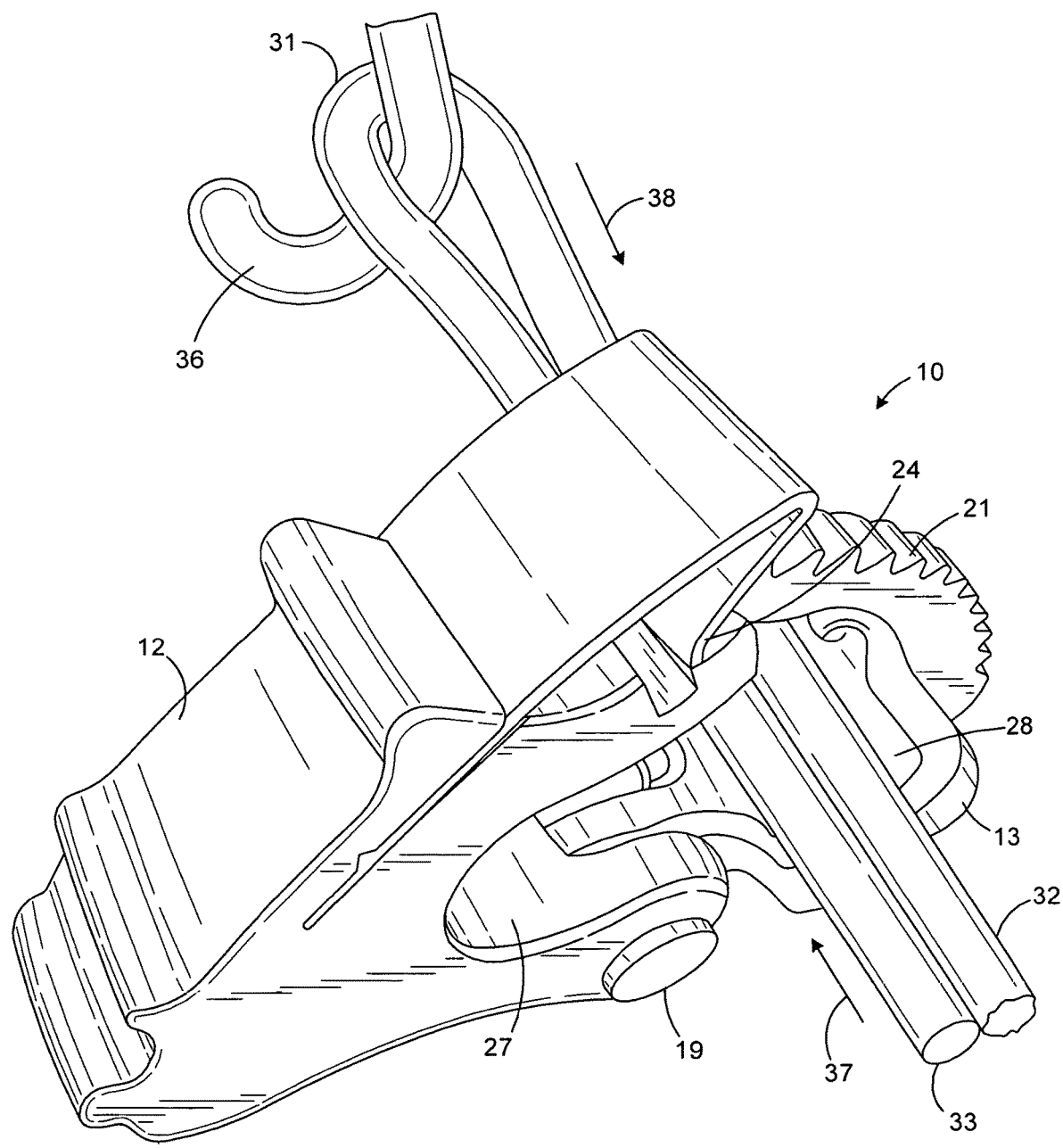
FIG. 2 is a perspective view of the rope tie of FIG. 1 showing the first and second arm members in a closed position holding the first and second portions of a rope in side-by-side relation.
Figure 3:
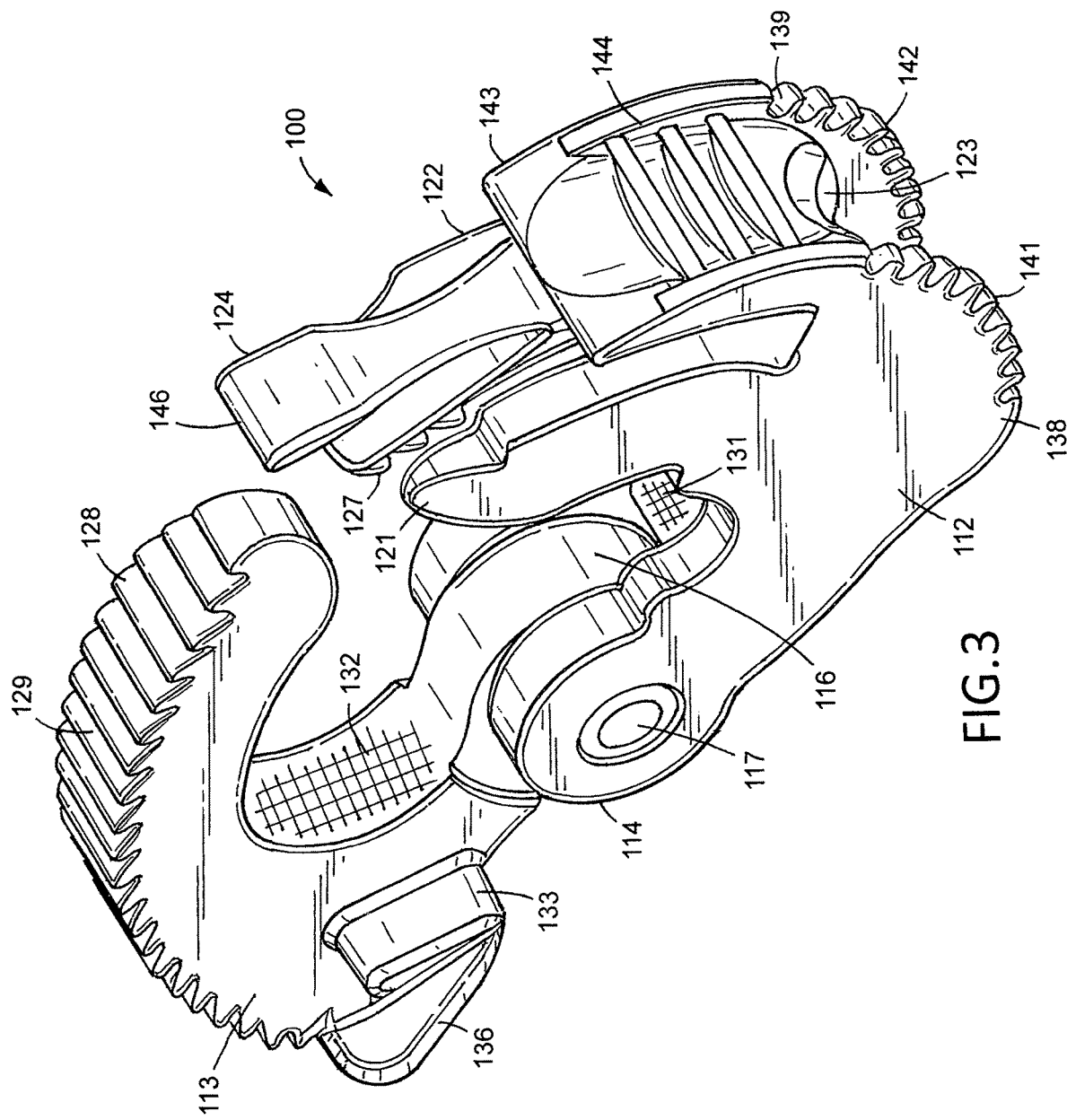
FIG. 3 is a perspective view of a first modification of the tie of FIG. 1 with the first and second arm members in an open position.
Figure 4:
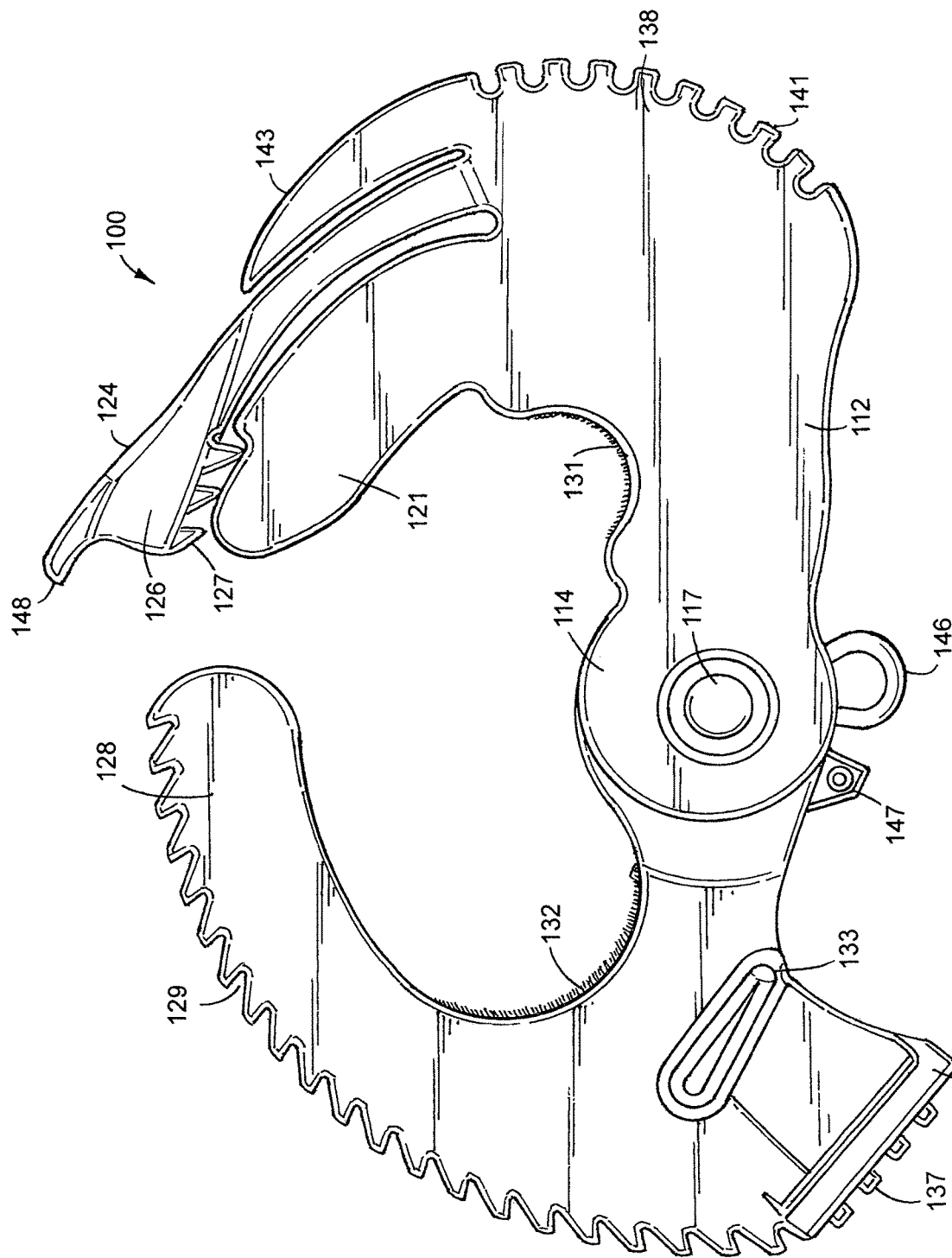
FIG. 4 is an elevated side view of the tie of FIG. 3.
Figure 5:
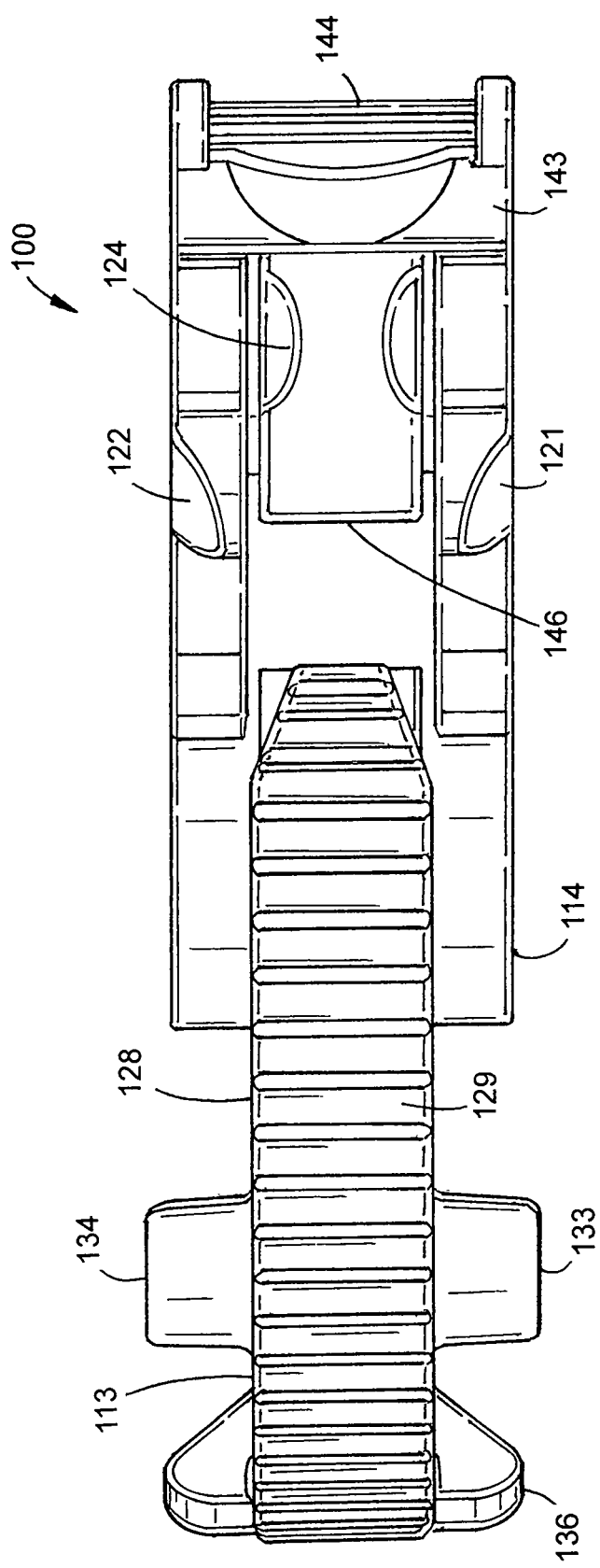
FIG. 5 is a top plan view of the tie of FIG. 3.
Figure 6:
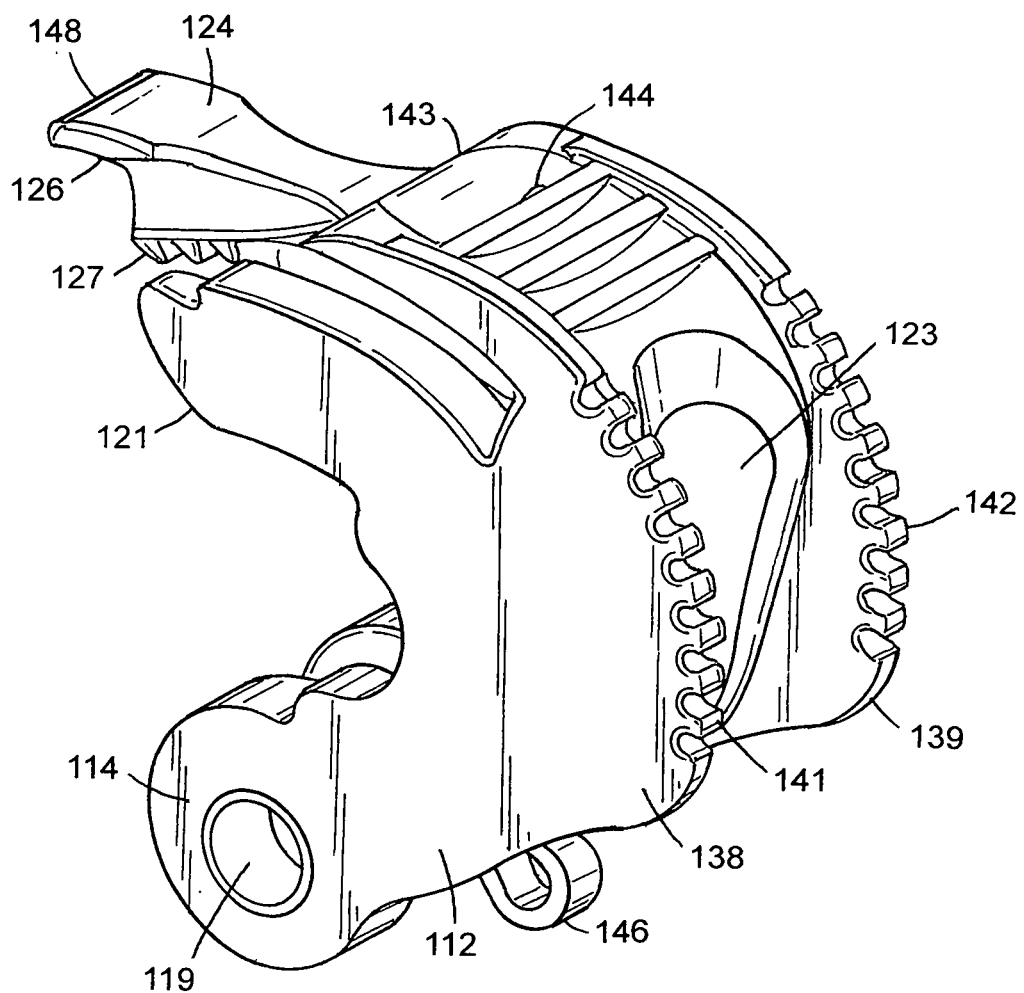
FIG. 6 is a perspective view of the first arm member disassembled from the second arm member of the tie of FIG. 3.
Figure 7:
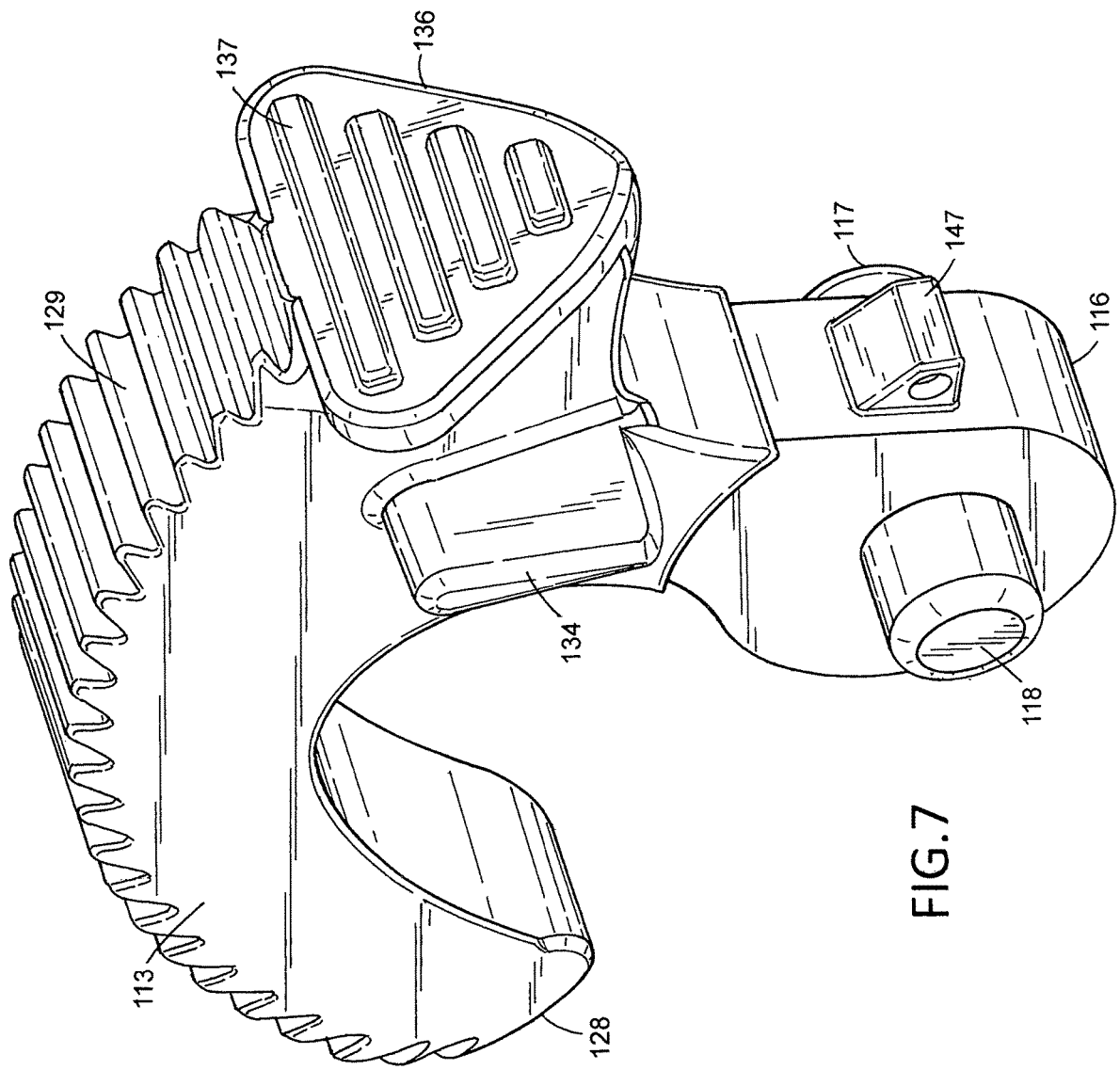
FIG. 7 is a perspective view of the second arm member disassembled from the first arm member of the tie of FIG. 3.
Figure 8:
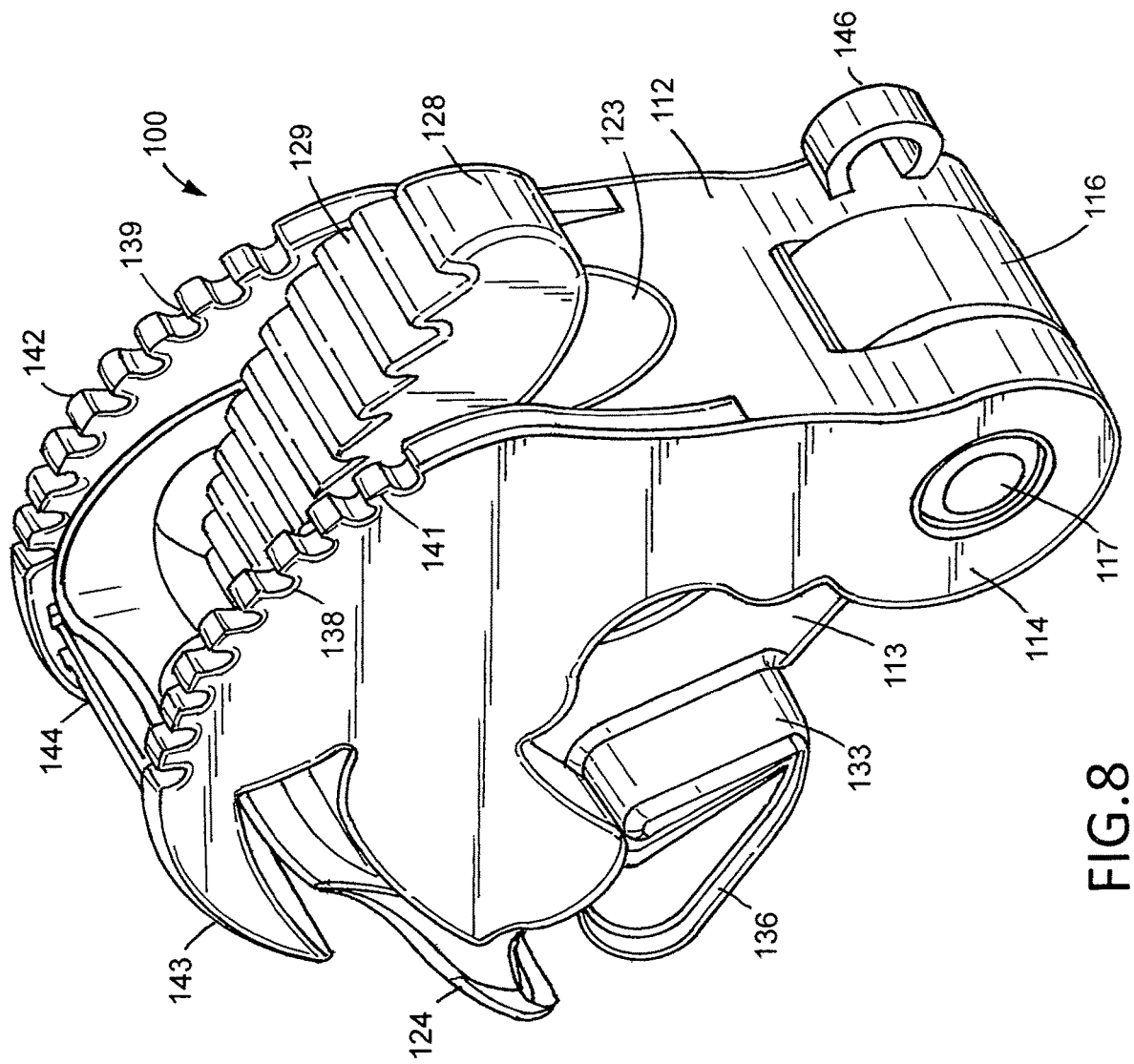
FIG. 8 is a perspective view of the tie of FIG. 3 in a closed position.
Figure 9:
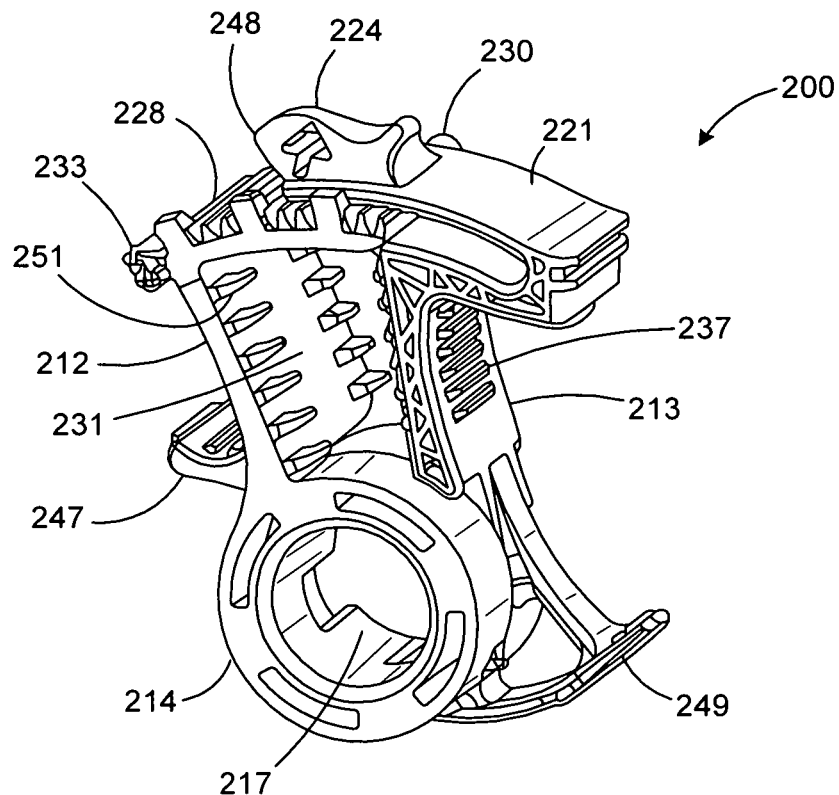
FIG. 9 is a perspective view of a second modification of the tie of FIG. 1 with the first and second arm members in a closed position.

Referring to FIGS. 1 and 2, there is shown a rope tie indicated generally at 10 useable to safely tie a horse to a tie site such as a tie ring, hitching rail, post, tree, cross-tie or any other site normally used to tie a horse. Rope tie 10 is also useable as a training aid for young and old horses. Rope tie 10 accepts all sizes of ropes and rope materials, such as cotton and other materials.

Rope tie 10 has a first arm member 12 pivotally connected to a second arm member 13 whereby arm members 12 and 13 are freely movable between open and closed positions and adapted to accommodate and resistibly hold first and second portions 32 and 33 of a rope 31 in side-by-side relation. First arm member 12 has a forked inner end 14 accommodating a reciprocal inner end 16 of second arm member 13. Inner ends 14 and 16 of arm members 12 and 13 are pivotally connected to each other with a pivot member 19 thereby allowing substantially resistance-free movement of arm members 12 and 13 relative to one another.

The outer end of first arm member 12 has a pair of inwardly curving fork members 17 that define an opening 26. A resilient clip member 23 attached to the outer end of first arm member 12 has a resilient end member 24 that extends into opening 26. Second arm member 13 has an inwardly curved outer end 18 having a plurality of notches 21. Outer end 18 is aligned with and movable through opening 26 when first and second arm members 12 and 13 are moved together into a closed position as shown in FIG. 2. The first and second arm members 12 and 13 have complementary inner generally smooth oppositely facing surfaces 27 and 28 having substantially similar surface areas whereby equalized pressure is placed on first and second portions 32 and 33 of rope 31 being forced together with first and second arm members 12 and 13. Guide members 30 attached to opposite sides of second arm member 13 extending outwardly adjacent lower end 16 are adapted to accommodate the fingers of a user to facilitate clamping and unclamping of the rope with one hand.

To hold rope tie 10 in a closed position, end member 24 of clip member 23 is moved into a selected notch 21 in the outer end 18 of second arm member 13. End member 24 is pinched or compressed whereby end member 24 moves toward the base of clip member 23 to move end member 24 out of notch 21 and allow second arm member 13 to separate from first arm member 12 thereby allowing rope tie 10 to be opened.

In use, when tying a horse, rope 31 is positioned around a tie site 36, such as a trailer, ring, post, tree or like sites. First and second portions 32 and 33 of rope 31 are placed on the open arm members 12 and 13 of rope tie 10 in a side-by-side relation. Arm members 12 and 13 are then closed around first and second portions 32 and 33 of rope 31. End member 24 of clip member 23 moves into a selected notch 21 to hold rope tie 10 around first and second portions 32 and 33 of rope 31 with a desired pressure. Rope tie 10 when positioned around first and second portions 32 and 33 of rope 31 creates drag or resistance to horse pull-backs on rope 31 when rope 31 is tied to a horse. The grip of rope tie 10 on first and second portions 32 and 33 of rope 31 is adjusted so that a selected effort is necessary to pull rope 31 through rope tie 10. If more resistance is desired, arm members 12 and 13 are moved closer together in order to close tighter around first and second portions 32 and 33 of rope 31. End member 24 is moved into the corresponding notch 21 to maintain the tighter grip on rope 31. To keep the horse tied after the horse pulls back, rope tie 10 is positioned around first and second portions 32 and 33 of rope 31 a selected distance from the loose end of second portion 33 of rope 31 to allow the horse a preferred number of pull-back steps to allow movement of rope 31 through rope tie 10 whereby the loose end of second portion 33 of rope 31 moves toward tie site 36 the first portion 32 of rope 31 moves away from tie site 36, as shown by arrows 37 and 38 in FIG. 2, to relieve the panic of the horse and increase the safety and comfort of the horse. Rope tie 10 enables the horse to be tied to a variety of available tie sites with the degree of resistance variable. Also, force of the horse pull-back is subjected to tie site 36 and rope 31 and not on rope tie 10.

A first modification of the rope tie indicated generally at 100, shown in FIGS. 3 to 8, is used to securely tie or dock a boat to a tie site such as a dock and other sites used to dock a boat. Rope tie 100 is adapted to quickly clamp boat ropes or lines tightly together thereby securing the boat to the dock without tying the lines with secure knots thereby making docking of boats quicker and easier without damage to the boat or dock.

Tie 100 has a first arm member 112 and a second arm member 113 pivotally connected to first arm member 112. First arm member 112 has an inwardly curved forked lower end 114 accommodating a reciprocal inwardly curved lower end 116 of second arm member 113. Second arm member 113 has a pair of cylindrical shaped hubs 117 and 118 that extend outwardly from lower end 116. Hubs 117 and 118 are aligned with and extend into corresponding holes 119 in forked lower end 114 of first arm member 112 to pivotally connect lower ends 114 and 116. This assembly of first and second arm members 112 and 113 allows limited resistance movement of first and second arm members 112 and 113 relative to each other and facilitates assembly of tie 100. A stop member 147 attached to lower end 116 of second arm member 113 limits the outward pivotal movement and separation of first and second arm members 112 and 113.

The upper end of first arm member 112 has a pair of inwardly curving laterally spaced fork members 121 and 122 defining a slotted opening 123 that extends through first arm member 112. First arm member 112 has a resilient lever member 124 located upwardly from fork members 121 and 122. Lever member 124 has an outer end 126 having a lower surface with a plurality of fingers 127 that extend downwardly into the top of slotted opening 123. Second arm member 113 has an inwardly curving upper end 128 adapted to be moved into slotted opening 123 when first and second arm members 112 and 113 are pivoted together. The outer surface of upper end 128 of second arm member 113 is convex curved and has a plurality of transverse notches 129. The forward portion of upper end 128 of second arm member 113 is inwardly tapered and aligned with slotted opening 123. When first and second arm members 112 and 113 are moved together upper end 128 of second arm member 113 moves into slotted opening 123 of first arm member 112 whereby lever member 124 slides up and over the convex curving outer surface of upper end 128. Fingers 127 of lever member 124 extend into notches 129 of upper end 128 which have been positioned beneath fingers 127 to prevent separation of first and second arm members 112 and 113.

Lever member 124 of first arm member 112 has an outwardly projected tab member 148 operable to move lever member 124 upwardly away from upper end 128 of the second arm member 113 to move fingers 127 out of notches 129 in upper end 128 to allow separation of first and second arm members 112 and 113. A guard member 143 attached to first arm member 112 is located above lever member 124 to limit the upward movement of lever member 124 thereby preventing lever member 124 from being inadvertently moved to an intolerable distance and broken off first arm member 112. Guard member 143 has a plurality of transverse ribs 144 to provide additional support to guard member 143.

First arm member 112 has a curved inner surface 131 having a cup shaped centrally located portion for accommodating line. Second arm member 113 has a concave curved inner surface 132 oppositely facing inner surface 131 of first arm member 112. Inner surfaces 131 and 132 of first and second arm members 112 and 113 each have a grip material or raised inwardly extending gripping texture to enhance the gripping action of first and second arm members 112 and 113 when clamped on a line to tightly secure the line and prevent line slippage.

Wing shaped guide members 133 and 134 attached to opposite sides of second arm member 113 extend outwardly adjacent lower end 116 of second arm member 113. Guide members 133 and 134 are adapted to accommodate the fingers of a user to facilitate clamping and unclamping of lines with one hand.

Second arm member 113 has a triangular shaped base member 136 having an inclined outer surface provided with transverse grip members 137. Base member 136 is located adjacent the proximal end of upper end 128 of second arm member 113. Grip members 137 facilitate gripping of tie 100 by the user. Base member 136 provides a surface for applying pressure to second arm member 113 to move lever member 124 over upper end 128 and allow upper end 128 to be moved into slotted opening 123 of first arm member 112.

First arm member 112 has a pair of laterally spaced convex curved flanges 138 and 139 extending outwardly opposite fork members 121 and 122 adjacent slotted opening 123. Flanges 138 and 139 have ribbed outer edges 141 and 142 to enhance gripping of tie 100. A loop member 146 attached to lower end 114 of first arm member 112 facilitates storage of tie 100.

In use when docking a boat, a first end portion of a boat rope or line is looped around a tie site such as a dock pillar, dock cleat or like tie sites, and positioned adjacent a second interior portion of the line. Tie 100 is moved to an open position whereby upper end 128 of second arm member 113 is separated from fork members 121 and 122 of first arm member 112. First and second arm members 112 and 113 are placed around the first and second portions of the line. First and second arm members 112 and 113 are then moved together to securely clamp the first and second portions of the line and prevent slippage of the line. The line can be held in one hand and tie 100 handled with the opposite hand to clamp the line. Additional lines are secured to other tie sites in the docking area in similar manner to safely secure the boat to the dock without tying a knot. Gripping material of inner surfaces 131 and 132 of first and second arm members 112 and 113 grip the line tightly and securely to prevent slippage of the line through tie 100. Finger guide members 133 and 134 on second arm member 113 allow tie 100 to be held and clamped with one hand freeing the other hand to manipulate and retain tension on the line around the tie site. To release tie 100 from the line, tab member 148 is actuated upwardly to move lever member 124 upwardly thereby moving fingers 127 out of notches 129 allowing first and second arm members 112 and 113 to separate from each other. Guard member 143 limits upward movement of lever member 124 to prevent excessive pull back of and damage to lever member 124. Tie 100 can be suspended with loop member 146 for easier accessibility, organization and storage.

A second modification of the rope tie indicated generally at 200, shown in FIGS. 9 to 14, is useable to securely tie a boat to a tie site, such as a cleat, dock post and other tie sites, when docking a boat. Rope tie 200 is also useable to clamp onto a boat fender line 203 to suspend a boat fender 201 at selected heights from a boating railing 202. Rope tie 200 is adapted to quickly and easily clamp onto boat ropes or boat lines to secure the boat to the dock without having to tie knots in the lines thereby facilitating docking of the boat and preventing damage to the boat and the dock.

Rope tie 200 has a first arm member 212 and a second arm member 213 pivotally connected to first arm member 212. First arm member 212 has a lower end 214 accommodating a lower end 216 of second arm member 213. Lower end 214 has a hollow center 215 aligned with a hollow center 218 of lower end 216. Lower end 214 has outwardly extending arcuate tabs 217. Tabs 217 are aligned with and extend through the periphery of hollow center 218 in lower end 216 of second arm member 213 to pivotally connect first arm member 212 and second arm member 213. A flange 219 projects outwardly from the outer end portion of each tab 217 adjacent the outer portion of lower end 216 to hold lower end 216 on tabs 217 adjacent lower end 214 and allow limited resistance movement of first arm member 212 and second arm member 213 relative to each other. A stop member 247 attached first arm member 212 adjacent lower end 214 engages a second stop member 249 attached to second arm member 213 to limit the outward pivotal movement and separation of first arm member 212 and second arm member 213.

The upper end of second arm member 213 has an inwardly curving fork member 221 defining a slotted opening 223. Second arm member 213 has a resilient lever member 224 extending upwardly from fork member 221. Fork member 221 has an outer end 226 having a lower surface with a plurality of downwardly extending fingers 227. First arm member 212 has an inwardly curving upper end 228 moveable into slotted opening 223 when first arm member 212 and second arm member 213 are pivoted together to a selected clamping position. The outer surface of upper end 228 of first arm member 212 is convex curved and has a plurality of transverse notches 229. Upper end 228 of first arm member 212 is aligned with slotted opening 223 whereby when first arm member 212 and second arm member 213 are moved together, upper end 228 moves into slotted opening 223 of second arm member 213 and lever member 224 moves up and over upper end 228 of first arm member 212. Fingers 227 of lever member 224 register with and extend into notches 229 of upper end 228 thereby preventing separation of first arm member 212 and second arm member 213. Upwardly extending projections 230 on upper end 228 are located adjacent the sides of fork member 221 when first arm member 212 and second arm member 213 are moved to the clamping position.

Lever member 224 of second arm member 213 has an outwardly projecting tab member 248. Tab member 248 is useable to move resilient lever member 224 upwardly and away from upper end 228 of first arm member 212. Moving lever member 224 away from upper end 228 moves fingers 227 out of notches 229 in upper end 228 thereby allowing separation of first arm member and second arm member 213.

Figure 10:
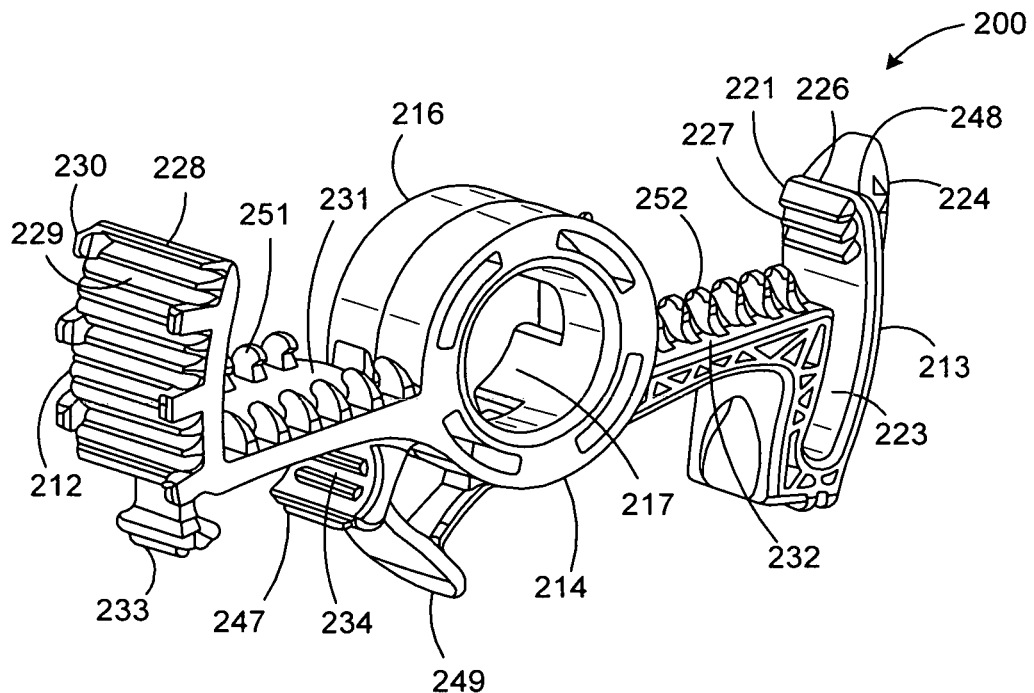
FIG. 10 is a perspective view of the tie of FIG. 9 with the first and second arm members in an open position.
Figure 11:
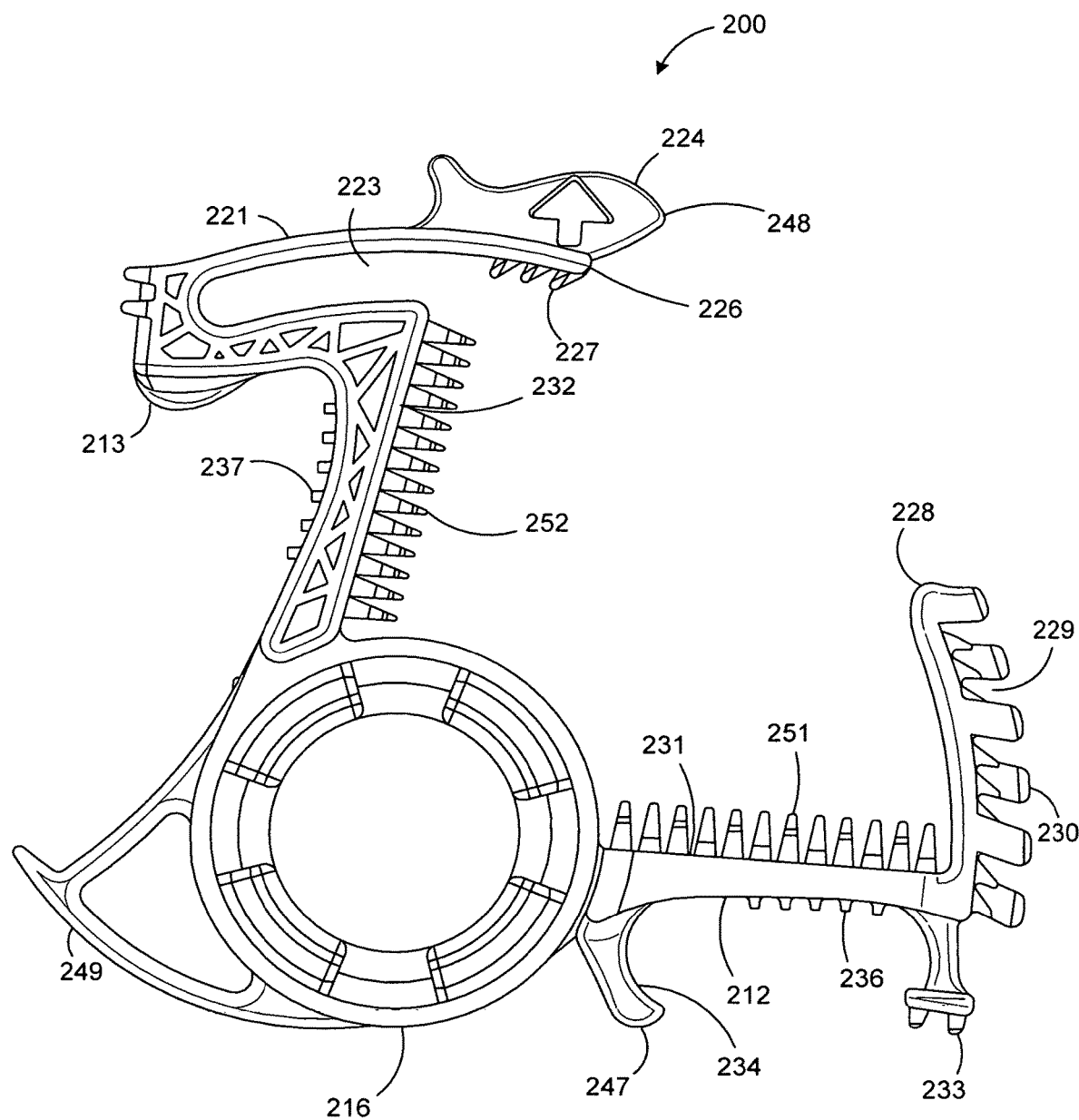
FIG. 11 is an enlarged elevated side view of the tie of FIG. 9 in a partially open position.
Figure 12:
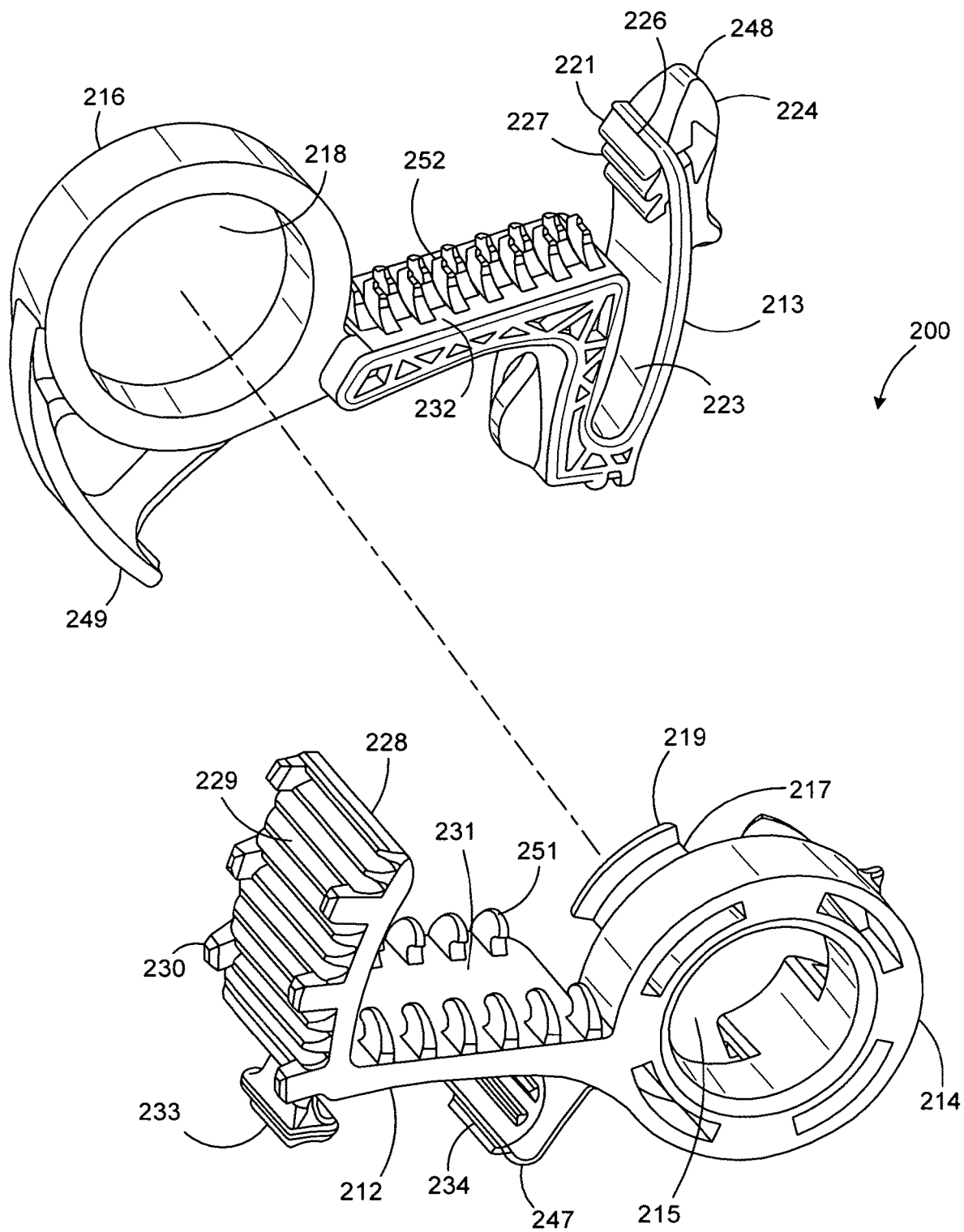
FIG. 12 is an exploded perspective view of the tie of FIG. 9.
Figure 13:
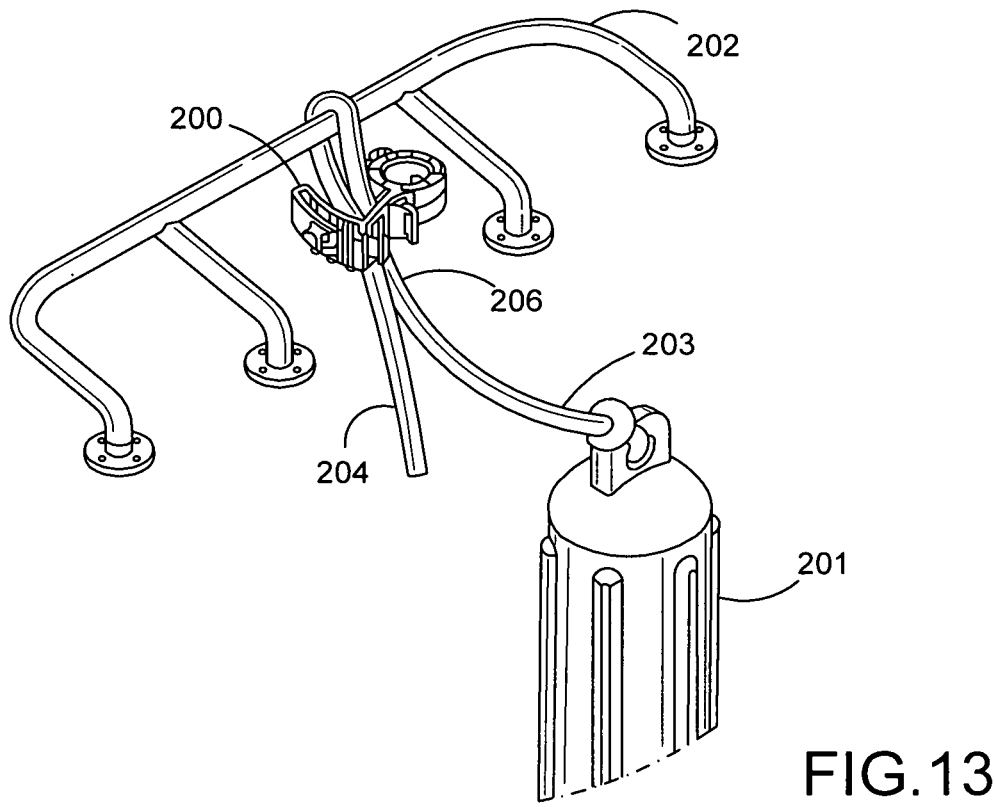
FIG. 13 is a perspective view of the tie of FIG. 9 showing the first and second arm members in a closed position holding the first and second portions of a boat fender line in side-by-side relation.

First arm member 212 has a substantially linear inner surface 231 for accommodating line 203. Second arm member 213 has a corresponding substantially linear inner surface 232 facing oppositely from inner surface 231 of first arm member 212. Inner surface 231 and inner surface 232 each have a grip material or grip texture, such as teeth 251 and 252, to enhance the gripping action of rope tie 200 on line 203 when first arm member and second arm member 213 are clamped on line 203 thereby tightly securing line 203 between first arm member 212 and second arm member 213 and prevent line slippage through rope tie 200. As shown in FIGS. 10 and 12, teeth 251 extend inwardly from and are located along the outer side portions of inner surface 231 of first arm member 212. Teeth 252 extend inwardly from and are located on the middle portion of inner surface 232 of second arm member 213 complementary to teeth 251.

Guide members 233 and 234 attached to the outer surface of first arm member 212 extend outwardly from the outer surface of first arm member 212. Guide members 233 and 234 are useable for accommodating the fingers of a user to facilitate clamping and unclamping line 203 with one hand.

First arm member 212 and second arm member 213 have transverse grip members 236 and 237 to facilitate gripping of rope tie 200 by a user.

In use, when tying a boat fender 201 to a boat, a first end portion 204 of line 203 is looped around a tie site, such as boating railing 202. First end portion 204 of line 203 is then positioned adjacent a second interior portion 206 of line 203. Tie 200 is moved to an open position whereby upper end 228 of first arm member 212 is separated from fork member 221 of second arm member 213. First arm member 212 and second arm member 213 are placed adjacent first end portion 204 and second interior portion 206 of line 203 and then moved together so as to securely clamp the first and second portions 204 and 206 of line 203 between first arm member 212 and second arm member 213 and hold fender 201 at a selected height between the boat hull and a dock. Height adjustment of fender 201 is easily accomplished by unclamping and then reclamping the first and second portions 204 and 206 after adjustment. First and second portions 204 and 206 of line 203 can be held in one hand by a user and rope tie 200 manipulated with the user's other hand to quickly and easily first and second portions 204 and 206 of line 203 without tying a knot in line 203. Teeth 251 and 252 of inner surfaces 231 and 232 of first arm member 212 and second arm member 213 tightly grip line 203 and securely hold line 203 to prevent slippage of line 203 through tie 200. Height adjustment of fender 201 is easily accomplished by releasing tie 200 from line 203 and allowing line 203 to move through tie 200 as needed. To release tie 200 from line 203, tab member 248 is actuated upwardly to move lever member 224 upwardly thereby moving fingers 227 out of notches 229 and allowing first arm member 212 and second arm member 213 to separate from each other. Upon readjustment of the height of fender 201, tie 200 is then reclamped on line 203.

Figure 14:
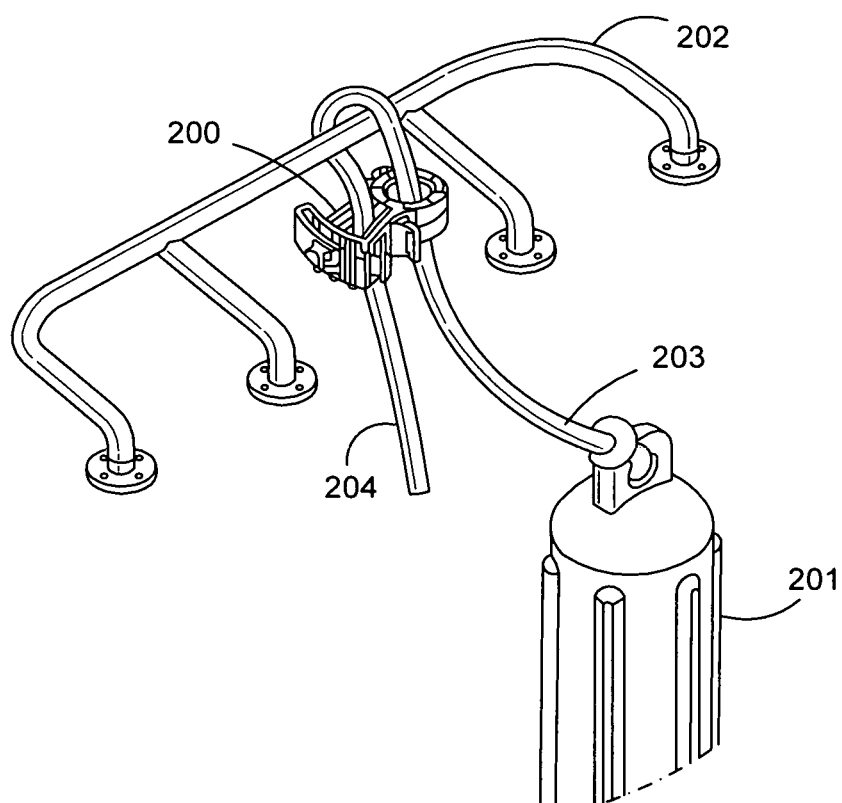
FIG. 14 is a perspective view of the tie of FIG. 9 showing the first and second arm members in a closed position holding the first end portion of a boat fender line.
Figure 15:
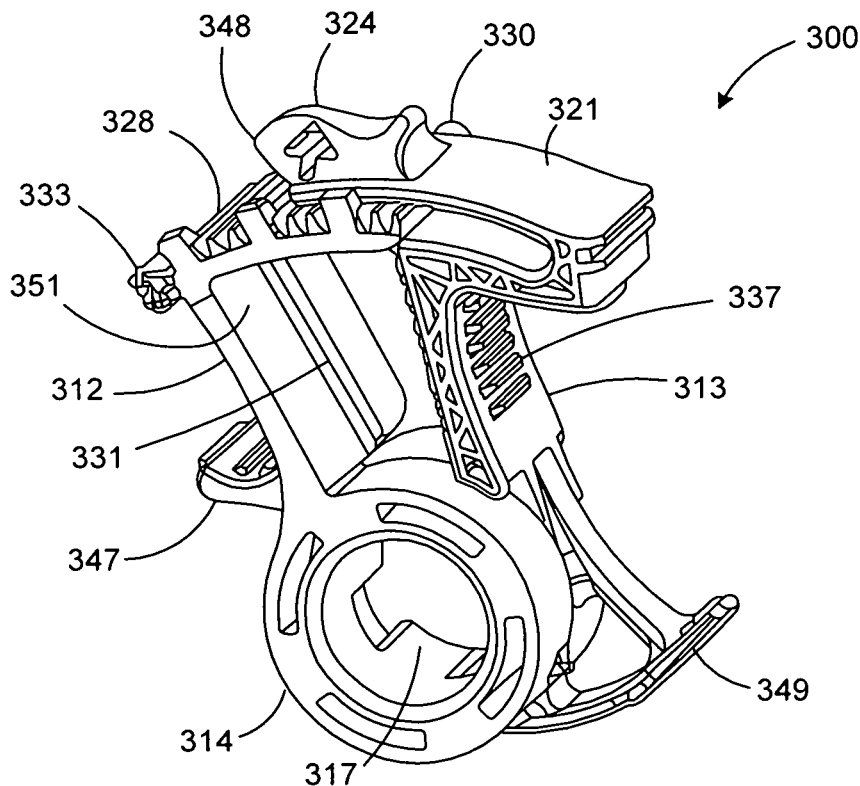
FIG. 15 is a perspective view of a third modification of the tie of FIG. 1 with the first and second arm members in a closed position.
Figure 16:
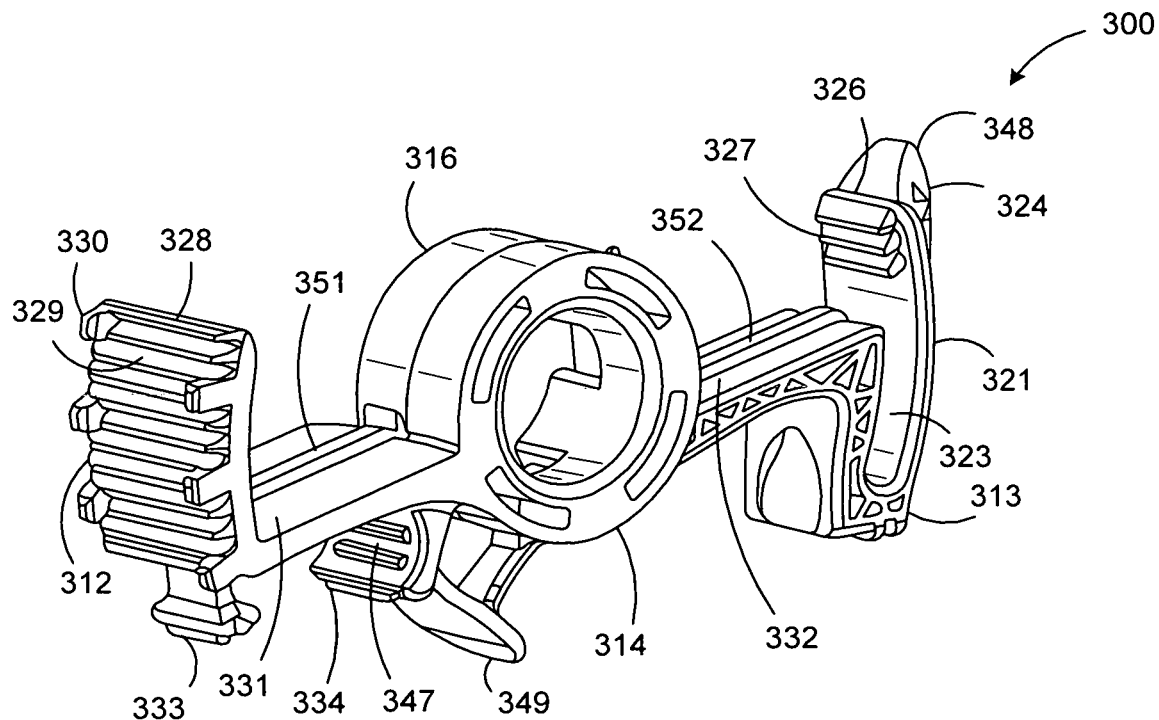
FIG. 16 is a perspective view of the tie of FIG. 15 with the first and second arm members in an open position.
Figure 17:
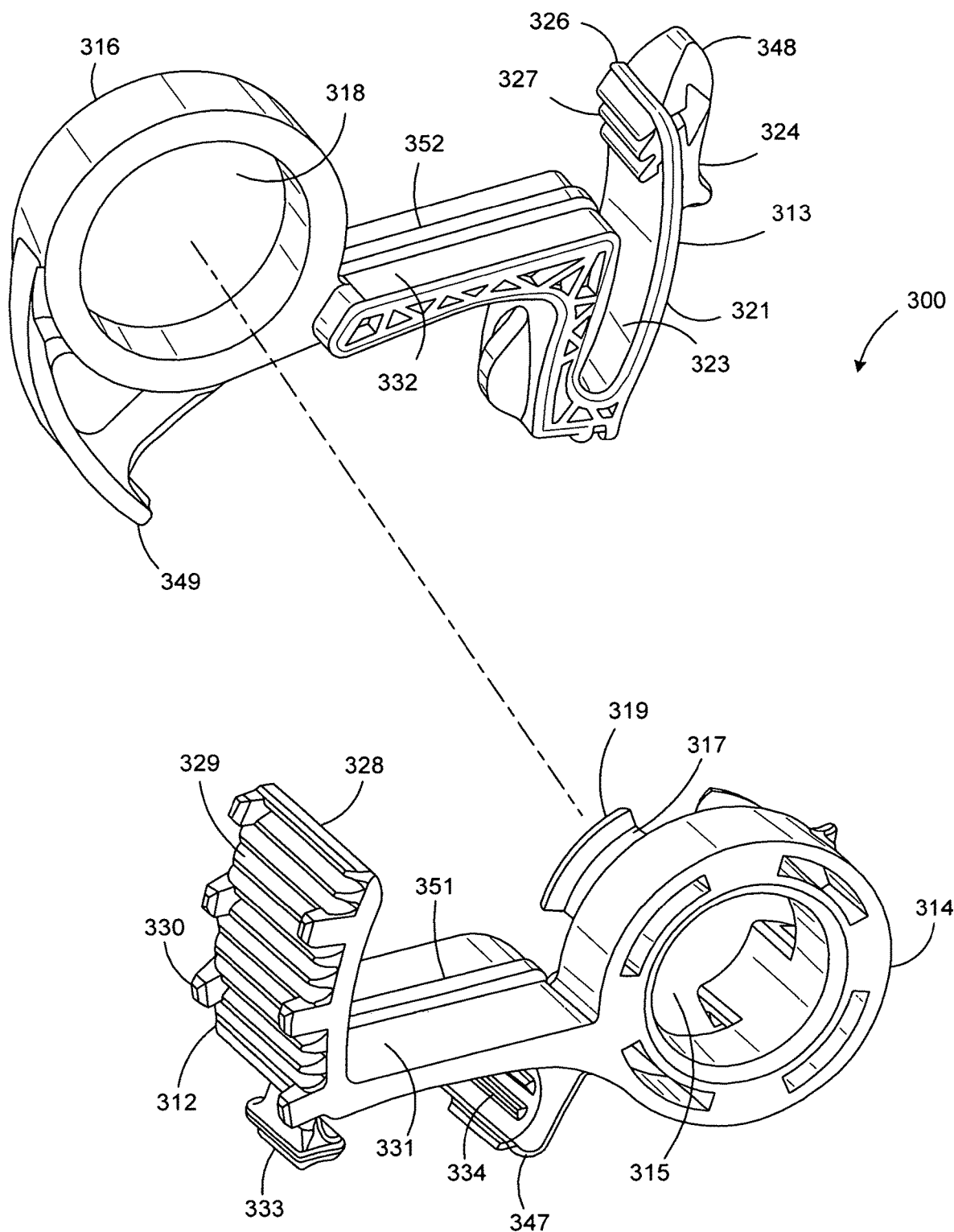
FIG. 17 is an exploded perspective view of the tie of FIG. 15.
Figure 18:
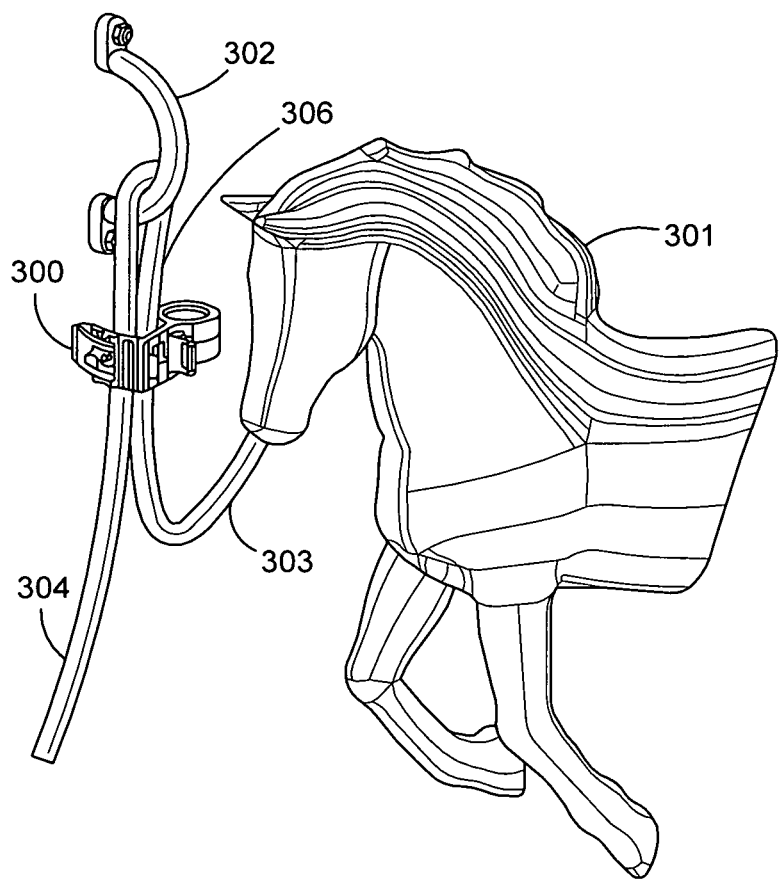
FIG. 18 is a perspective view of the tie of FIG. 15 showing the first and second arm members in a closed position holding the first and second portions of a rope.

Alternatively, as shown in FIG. 14, first end portion 204 of line 203 is moved through hollow centers 215 and 218 of lower ends 214 and 215 of first and second arm members 212 and 213 and then looped around a tie site 202, such as a boating railing. Rope tie 200 is moved to a closed position in engagement with first end portion 204 to created a gripping force on line 203 and prevent slippage of line 203 through rope tie 200.

A third modification of the rope tie indicated generally at 300 shown in FIGS. 15 to 19, is useable to safely tie a horse 301 to a tie site 302, such as a tie ring, trailer, fence or other tie sites, with a rope 303 to avoid pull back and injury to horse 301 and minimize property damage. Rope tie 300 also facilitates training for both young and older horses.

Rope tie 300 has a first arm member 312 and a second arm member 313 pivotally connected to first arm member 312 whereby first arm member 312 and second arm member 313 are moveable between an open position and a plurality of selected closed positions. First arm member 312 and second arm member 313 cooperate to accommodate and resistibly hold one or more portions of rope 303. First arm member 312 has a lower end 314 accommodating a lower end 316 of second arm member 313. Lower end 314 has a plurality of outwardly extending arcuate tabs 317. Tabs 317 are aligned with and pass through hollow center 318 in lower end 316 to pivotally connect first arm member 312 and second arm member 313. Flanges 319 projecting outwardly and upwardly from the outer end portions of tabs 317 adjacent the outer portion of lower end 316 hold lower end 316 on tabs 317 while allowing pivotal movement of first arm member 312 and second arm member 313 relative to each other. A stop member 347 attached to first arm member 312 adjacent lower end 314 is adapted to engage a second stop member 349 attached to second arm member 313 to limit the outward pivotal movements of first arm member 312 and second arm member 313 and define the open position of rope tie 300.

The upper end of second arm member 313 has an inwardly curving fork member 321 forming a slotted opening 323. Second arm member 313 has an upwardly extending flexible lever member 324. Outer end 326 of fork member 321 has a lower surface having a plurality of fingers 327 that extend downwardly from the lower surface of outer end 326 of fork member 321. First arm member 312 has an inwardly curving upper end 328 accommodated by slotted opening 323 when first arm member 312 and second arm member 313 are pivoted together to a selected closed position. Upper end 328 of first arm member 312 has a convex curved outer surface having a plurality of transverse notches 329. Upper end 328 is aligned with slotted opening 323 whereby when first arm member 312 and second arm member 313 are pivoted together upper end 328 is moved into and received by slotted opening 323. Moving upper end 328 into slotted opening 323 forces lever member 324 to move upwardly and over upper end 328. Lever member 324 has resiliency whereby fingers 327 of lever member 324 extend into and register with selected notches 329 in upper end 328 of first arm member 312 to prevent separation of first arm member 312 and second arm member 313 and vary the gripping pressure of rope tie 300 on rope 303, as desired. Upwardly extending projections 330 on upper end 328 are located adjacent the sides of fork member 321 when first arm member 312 and second arm member 313 are moved to a selected closed position.

Lever member 324 has an outwardly projecting tab member 348 useable to move lever member 324 upwardly and away from upper end 328 of first arm member 312 to release first arm member 312 from second arm member 313. Moving lever member 324 apart from upper end 328 moves fingers 327 away from and out of notches 228 in upper end 328 thereby permitting first arm member 312 and second arm member 313 to be separated from each other.

First arm member 312 has a substantially linear inner surface 331. Second arm member 313 has a substantially linear inner surface 332 facing oppositely from and corresponding to inner surface 331 of first arm member 312. Inner surfaces 331 and 332 each have a rib 351 and 352. Ribs 351 and 352 extend longitudinally along and outwardly from inner surfaces 331 and 332 of first arm member 312 and second arm member 313. Inner surfaces 331 and 332 have substantially the same surface areas whereby equalized pressure can be applied to rope 303. When first arm member 312 and second arm member 313 are moved to a selected closed position and rope 303 is located between first arm member 312 and second arm member 313, inner surfaces 331 and 332 and ribs 351 and 352 engage rope 303 and resistibly hold rope 303 between first arm member 312 and second arm member 313.

Guide members 333 and 334 attached to the outer surface of first arm member 312 extend outwardly from first arm member 312. Guide members 333 and 334 are useable to facilitate opening and closing rope tie 300 with a single hand of a user. Second arm member 313 also has a transverse grip member 337 to facilitate gripping and manipulating rope tie 300 by the user.

In use to safely tie a horse 301 to a tie site 302, rope 303 is looped through tie site 302. With first arm member 312 and second arm member 313 in an open position, first end portion 304 and second interior portion 306 of rope 303 are placed between first arm member 312 and second arm member 313 in a side-by-side relation. First arm member 312 and second arm member 313 are then moved to a closed position whereby inner surfaces 331 and 332 and ribs 351 and 352 of first arm member 312 and second arm member 313 engage first end portion 304 and second interior portion 306 of rope 303. Fingers 327 of lever member 324 are moveable into selected notches 329 in upper end of first arm member 312 to hold rope tie 300 in engagement with first end portion 304 and second interior portion 306 of rope 303 with a desired gripping pressure. Rope tie 300, when in a closed position in engagement with first end portion 304 and second interior portion 306 of rope 303, creates drag or resistance to a horse pull-back on rope 303 when tied to horse 301. The gripping pressure of rope tie 300 on first end portion 304 and second interior portion 306 of rope 303 is adjustable in a plurality of increments whereby a selected effort or pulling force is required to move or pull rope 303 through first arm member 312 and second arm member 313 of rope tie 300. If an increased resistance is desired, first arm member 312 and second arm member 313 are moved closer together to increase the gripping pressure on first end portion 304 and second interior portion 306 of rope 303. Fingers 327 are moved toward inner surface 331 of first arm member 312 and into corresponding notches 329 to maintain the increased gripping force on rope 303. If a decreased resistance is desired, first arm member 312 and second arm member 313 are moved further apart to decrease the gripping pressure on first end portion 304 and second interior portion 306 of rope 303. Fingers 327 are moved away from inner surface 331 of first arm member 312 and into corresponding notches 329 to maintain the decreased gripping force on rope 303. During a horse pull-back, first end portion 304 of rope 303 moves through rope tie 300 toward the tie site 302 and second interior portion 306 of rope 303 moves away from tie site 302 to relieve the panic of horse 301 and increase the safety and comfort of horse 301 and subject the force of the horse pull-back primarily to tie site 302 and rope 303. To release rope tie 300 from rope 303 or to adjust the gripping position of first arm member 312 and second arm member 313 and decrease resistance to a horse pull-back, tab member 348 is moved upwardly to move lever member 324 upwardly so as to move fingers 327 out of notches 329 and allow first arm member 312 and second arm member 313 to move apart from each other, as desired.

Figure 19:
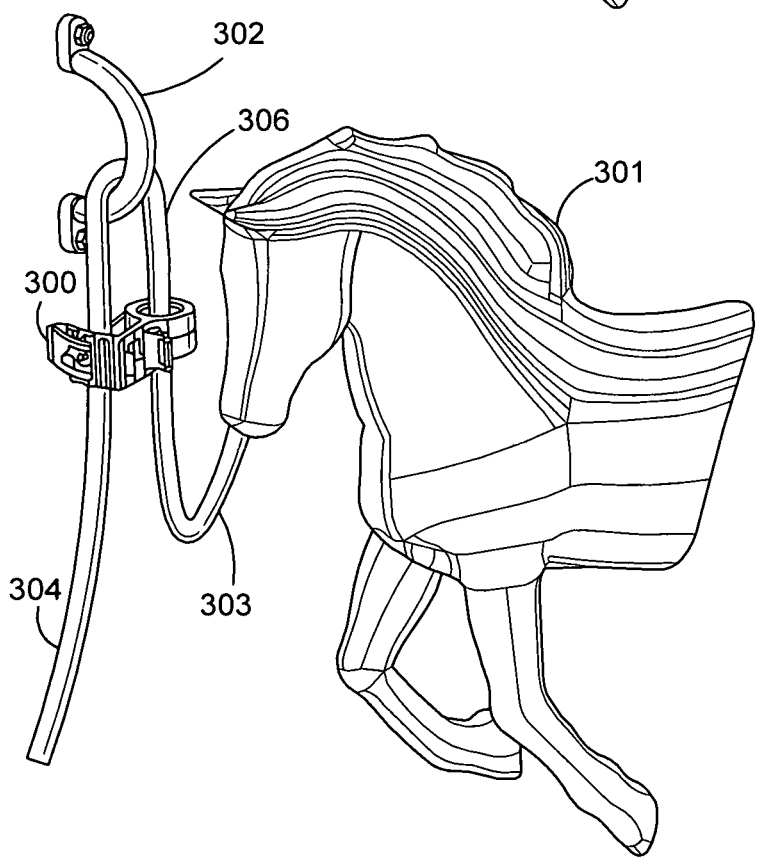
FIG. 19 is a perspective view of the tie of FIG. 15 showing the first and second arm members in a closed position holding the first end portion of a rope.

Alternatively, as shown in FIG. 19, first end portion 304 of rope 303 is moved through hollow centers 315 and 318 of lower ends 314 and 316, around tie site 302 and then placed between first arm member 312 and second arm member 313. Rope tie 300 is moved to a selected closed position with inner surfaces 331 and 332 and ribs 351 and 352 of first and second arm members 312 and 313 in engagement with first end portion 304 to create a selected gripping force on rope 303 and regulate the length of a horse pull-back.

The foregoing disclosure of the invention describes and illustrates several embodiments of the rope tie of the invention. Modifications, changes in parts and arrangement of parts and materials may be made to the rope tie defined in the claims herein by persons skilled in the art without departing from the invention.

The invention claimed is:

1. A tie for securing a line comprising:
a first arm member,
a second arm member pivotally connected to the first arm member,
the first arm member having a first lower end with a first hollow center,
the second arm member having a second lower end with a second hollow center aligned with the first hollow center,
the first lower end having outwardly extending tabs aligned with and extending through the second hollow center to pivotally connect the first arm member and the second arm member,
the first and second arm members freely movable together and adapted to clamp onto a line positioned around a tie site, the line having one or more portions located between the first and second arm members,
the first arm member having a first linear inner surface,
the first linear inner surface having a first row of inwardly directed teeth located along a first outer side of the first linear inner surface,
the first linear inner surface having a second row of inwardly directed teeth located along a second outer side of the first linear surface opposite from the first outer side surface,
the second row of inwardly directed teeth transversely spaced from the first row of inwardly directed teeth,
the second arm member having a second linear inner surface oppositely facing from the first linear inner surface,
the second linear inner surface having a third row of inwardly directed teeth,
the third row of inwardly directed teeth located between the first row of inwardly directed teeth and the second row of inwardly directed teeth when the first arm member and the second arm member are moved to a closed clamped position, and
a resilient lever member attached to the first arm member,
the resilient lever member engageable with the second arm member to releasably hold the first and second arm members in the closed clamped position whereby the first row of inwardly directed teeth, the second row of inwardly directed teeth and the third row of inwardly directed teeth are held in engagement with the one or more portions of the line preventing movement of the line through the first and second arm members.

2. The tie of claim 1 wherein:
the relative positions of the first and second arm members are adjustably held by the lever member to selectably adjust the closed position.

3. The tie of claim 1 including:
a pair of guide members attached to the second arm member adapted to facilitate movement of the first and second arm members.

4. A rope tie for tying a rope comprising:
a first arm member,
the first arm member having a first linear inner surface,
a second arm member pivotally connected to the first arm member,
the second arm member having a second linear inner surface facing oppositely from the first linear inner surface,
the first arm member and the second arm member movable together to apply pressure on one or more portions of a rope located between the first arm member and the second arm member,
the first linear inner surface having a first row of inwardly directed teeth and a second row of inwardly directed teeth transversely spaced from the first row of inwardly directed teeth,
the first row of inwardly directed teeth located along a first side of the inner linear surface, the second row of inwardly directed teeth located along a second side of the first linear inner surface transversely spaced from the first side of the first linear inner surface, the second linear inner surface having a third row of inwardly directed teeth, the third row of inwardly directed teeth located between the first row of inwardly directed teeth and the second row of inwardly directed teeth when the first arm member and the second arm member are moved to a closed clamped position, and a lever member attached to the first arm member, the lever member having a resilient end member engageable with the second arm member to releasably hold the first arm member and the second arm member in the closed clamped position around the one or more portions of the rope whereby the first row of inwardly directed teeth, the second row of inwardly directed teeth and the third row of inwardly directed teeth apply a selected pressure on the one or more portions of the rope preventing movement of the one or more portions of the rope through the first arm member and the second arm member.

5. The rope tie of claim 4 wherein:
the relative positions of the first and second arm members are adjustably held by the lever member to prevent movement of the one or more portions of the rope through the first and second arm members.

6. The rope tie of claim 4 wherein:
the first and second arm members force the one or more portions of the rope together to create the selected pressure.

7. The rope tie of claim 4 wherein:
the first and second arm members apply equal pressure on the one or more portions of the rope.

8. The rope tie of claim 4 wherein:
the first and second linear inner surfaces are oppositely facing linear inner surfaces, the oppositely facing linear inner surfaces each having a surface area adapted to apply equal pressure on the one or more portions of the rope located between the first and second arm members.

9. The rope tie of claim 4 including:
guide members attached to the second arm member adapted to facilitate movement of the first and second arm members.

10. A rope tie comprising:
a first arm member,
the first arm member having a first linear inner surface,
a second arm member pivotally connected to the first arm member,
the second arm member having a second linear inner surface facing oppositely from the first linear inner surface,
the first arm member and the second arm member movable to a closed position to apply pressure on one or more portions of a rope located between the first arm member and the second arm member, and
a lever member attached to the first arm member,
the lever member engageable with the second arm member to releasably hold the first arm member and the second arm member in the closed position around the one or more portions of the rope,
the first linear inner surface having a first row of inwardly directed teeth located along a first outer side of the first linear inner surface,
the first linear inner surface having a second row of inwardly directed teeth located along a second outer side of the first linear surface,
the second row of inwardly directed teeth transversely spaced from the first row of inwardly directed teeth,
the second linear inner surface having a third row of inwardly directed teeth,
the third row of inwardly directed teeth located between the first row of inwardly directed teeth and the second row of inwardly directed teeth when the first arm member and the second arm member are moved to a closed clamped position,
the plurality of second teeth extending inward from and located on a middle portion of the second linear inner surface complementary to the plurality of first teeth,
the first, second and third rows of inwardly directed teeth adapted to cooperate and tightly grip the one or more portions of the line to enhance gripping action of the first and second arm members when the first and second arm members are clamped on the one or more portions of the rope to prevent rope slippage.

11. The rope tie of claim 10 wherein:
the first arm member has a slotted opening,
the second arm member having an upper end moveable into the slotted opening when the first and second arm members are moved to the closed position.

12. The rope tie of claim 10 wherein:
the oppositely facing first and second linear inner surfaces of the first and second arm members apply equal pressure on the one or more portions of the rope located between the first and second arm members.

13. The rope tie of claim 10 wherein:
the relative positions of the first and second arm members are adjustably held by the lever member.

14. The rope tie of claim 10 wherein:
the lever member has a tab member operable to move the lever member upwardly out of engagement with the second arm member and allow separation of the first and second arm members.

15. The rope tie of claim 10 including:
a stop member attached to the second arm member to limit outward pivotal movement and separation of the first and second arm members.

* * * * *